US012587793B2

(12) United States Patent
Pang et al.

(10) Patent No.: US 12,587,793 B2
(45) Date of Patent: Mar. 24, 2026

(54) SOUNDING DEVICE

(71) Applicant: AAC Microtech (Changzhou) Co., Ltd., Changzhou (CN)

(72) Inventors: Wei Pang, Changzhou (CN); Zhenhua Gu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 152 days.

(21) Appl. No.: 18/518,647

(22) Filed: Nov. 24, 2023

(65) Prior Publication Data

US 2024/0340593 A1 Oct. 10, 2024

Related U.S. Application Data

(63) Continuation of application No. PCT/CN2023/087190, filed on Apr. 10, 2023.

(51) Int. Cl.
*H04R 9/06* (2006.01)
*H04R 7/04* (2006.01)

(52) U.S. Cl.
CPC ................. *H04R 9/06* (2013.01); *H04R 7/04* (2013.01)

(58) Field of Classification Search
None
See application file for complete search history.

(56) References Cited

FOREIGN PATENT DOCUMENTS

| | | | | |
|---|---|---|---|---|
| CN | 110708642 B | * 7/2022 | ............... | H04R 9/02 |
| CN | 217591075 U | * 10/2022 | | |
| WO | WO-2021007798 A1 | * 1/2021 | ............... | H04R 9/06 |

OTHER PUBLICATIONS

English Language Translation of WO 2021/007798, pp. 1-5. (Year: 2021).*
English Language Translation of CN 110708642 B, pp. 1-8. (Year: 2022).*
English Language Translation of CN 217591075 U, pp. 1-5. (Year: 2022).*

* cited by examiner

*Primary Examiner* — Paul W Huber
(74) *Attorney, Agent, or Firm* — Wiersch Law Group

(57) ABSTRACT

The present disclosure discloses a sounding device including a frame, a vibration system mounted on the frame, including a diaphragm fixed to the frame and enclosing a front cavity with the frame; and a magnet system configured to drive the vibration system to generate sound, enclosing a rear cavity with the diaphragm and the frame; a connection hole is provided on the frame for connecting the front cavity with the rear cavity; an air-permeable membrane is inserted into the frame and covers the connection hole. The sounding device in the present disclosure has high assembly performance, waterproof performance and acoustic performance.

4 Claims, 4 Drawing Sheets

A-A

A-A

B

SOUNDING DEVICE

FIELD OF THE PRESENT DISCLOSURE

The present disclosure relates to electric-acoustic conversion technologies, especially relates to a sounding device applied in portable mobile terminals.

DESCRIPTION OF RELATED ART

With the development of the portable mobile terminal technologies, users have increasingly high requirements for the sound quality of portable mobile terminals. And a sounding device in portable mobile terminals is one of the necessary conditions to achieve this high-quality sound effect, which is configured to achieve conversion between electric signal and acoustic signal.

In related art, the sounding device includes a frame and a vibration system and a magnet system mounted on the frame. The vibration system includes a diaphragm and an air-permeable membrane. The diaphragm is fixed to the frame and encloses a rear cavity with the magnet system. A through hole is provided on the diaphragm to communicate with the rear cavity. The air-permeable membrane is attached to the diaphragm and fully covers the through hole. However, the glue area between the air-permeable membrane and the diaphragm forms a complex structure which is difficult to assemble. Besides, the glue structure of the air-permeable membrane and the diaphragm negatively affects the diaphragm, thus reducing the acoustic performance of sounding device.

Therefore, it is necessary to provide an improved sounding device to overcome the problems mentioned above.

SUMMARY OF THE INVENTION

One object of the present disclosure is to provide a sounding device with higher assembly performance, waterproof performance and acoustic performance.

The sounding device includes a frame, a vibration system mounted on the frame, including a diaphragm fixed to the frame and enclosing a front cavity with the frame; and a magnet system configured to drive the vibration system to generate sound, enclosing a rear cavity with the diaphragm and the frame; wherein a connection hole is provided on the frame for connecting the front cavity with the rear cavity; an air-permeable membrane is inserted into the frame and covers the connection hole.

As an improvement, the frame and the air-permeable membrane are integrated by injection molding.

As an improvement, the frame includes a holder fixed to the magnet system and a flange fixed to the holder; the diaphragm is fixed to the flange, the connection hole is provided on the flange, the air-permeable membrane, the diaphragm, and the flange are integrated by injection molding.

As an improvement, the sound device further includes a silicone waterproof ring surrounding the flange; the silicone waterproof ring and the flange are integrated by injection molding.

As an improvement, the connection hole includes a first opening communicated with the front cavity and the second opening communicated with the rear cavity; the air-permeable membrane is mounted between the first opening and the second opening.

As an improvement, an outer edge of the diaphragm is fixed to the flange.

As an improvement, the diaphragm includes a dome located in a central position and an edge portion surrounding the dome; an outer edge of the edge portion is fixed to the flange.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
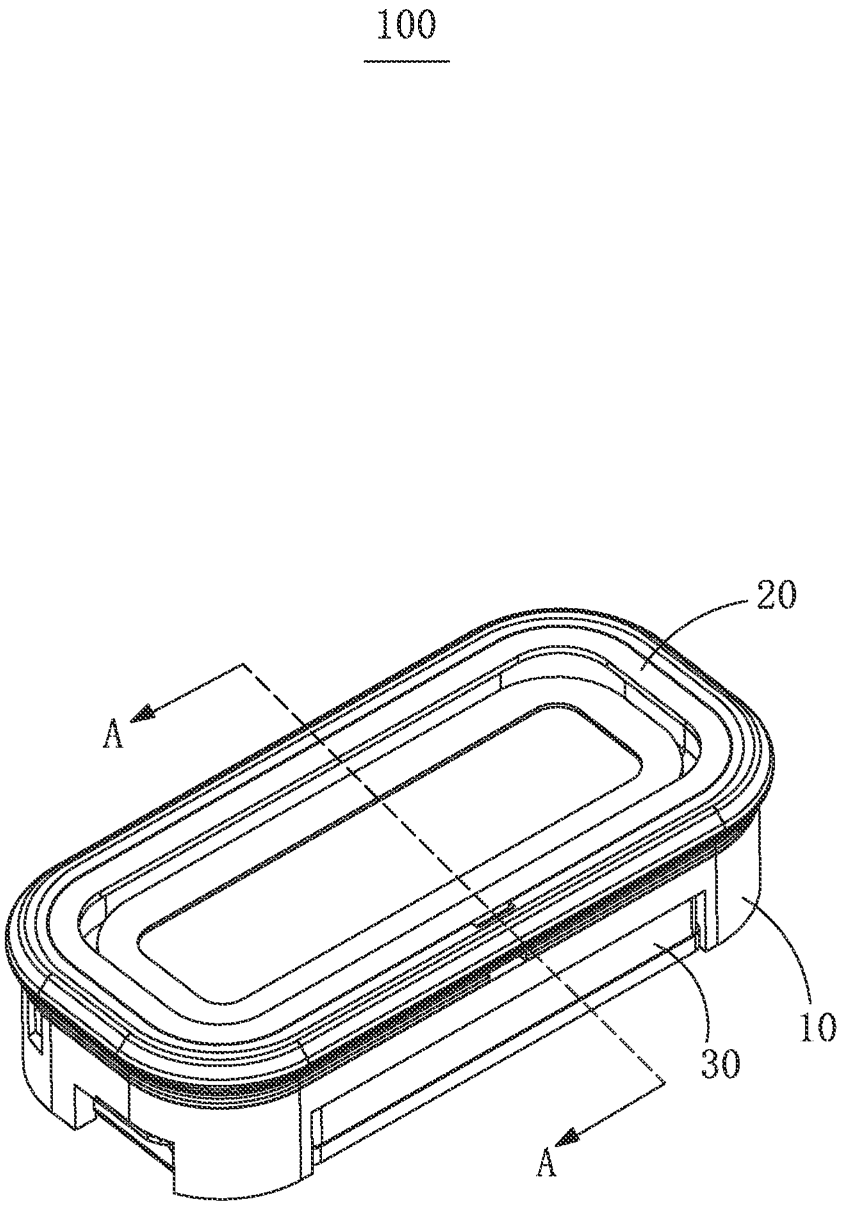
FIG. 1 is an isometric view of a sounding device in accordance with an exemplary embodiment of the present disclosure.
Figure 2:
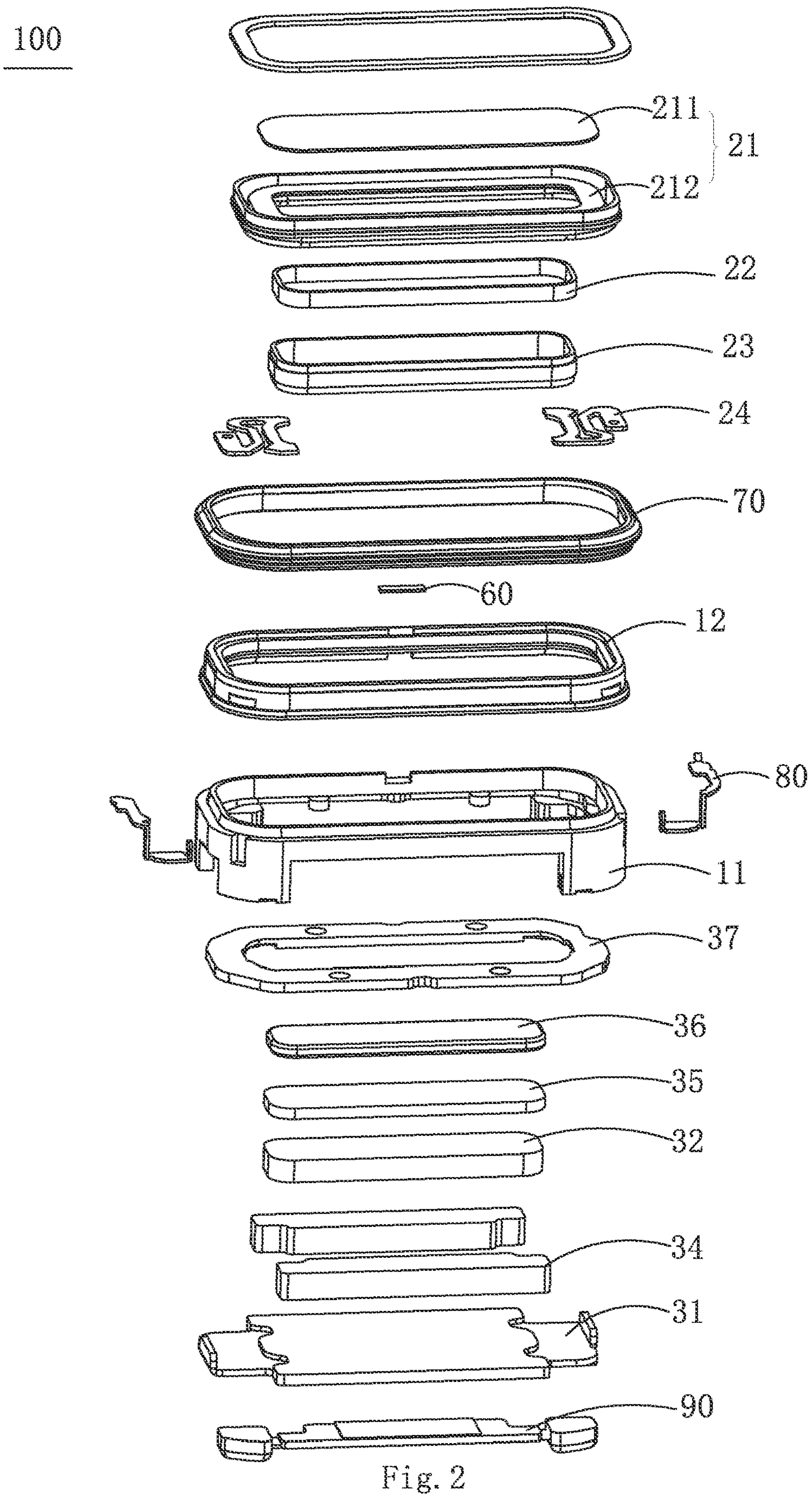
FIG. 2 is an exploded view of the sounding device in FIG. 1.
Figure 3:
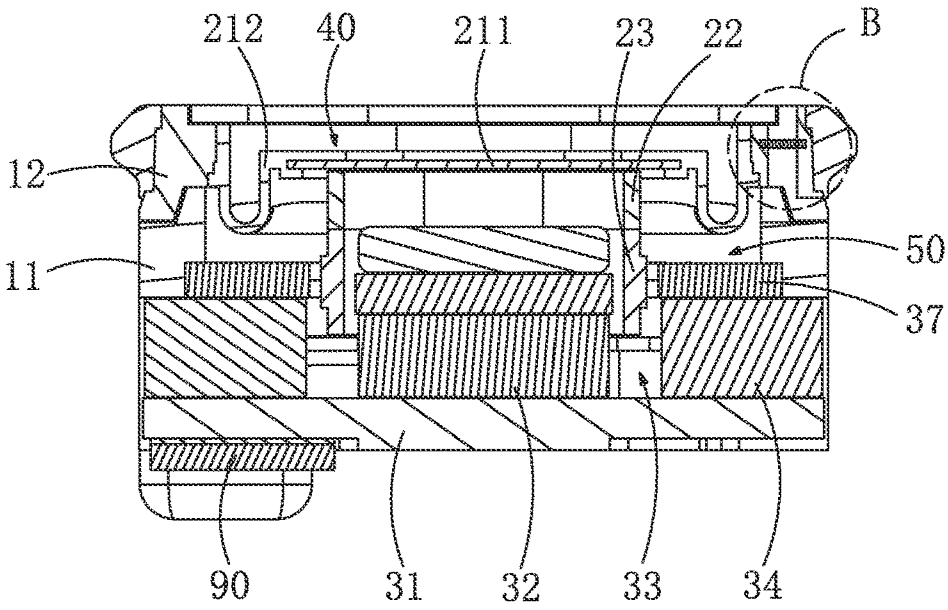
FIG. 3 is a cross-sectional view of the sounding device taken along line A-A in FIG. 1.
Figure 4:
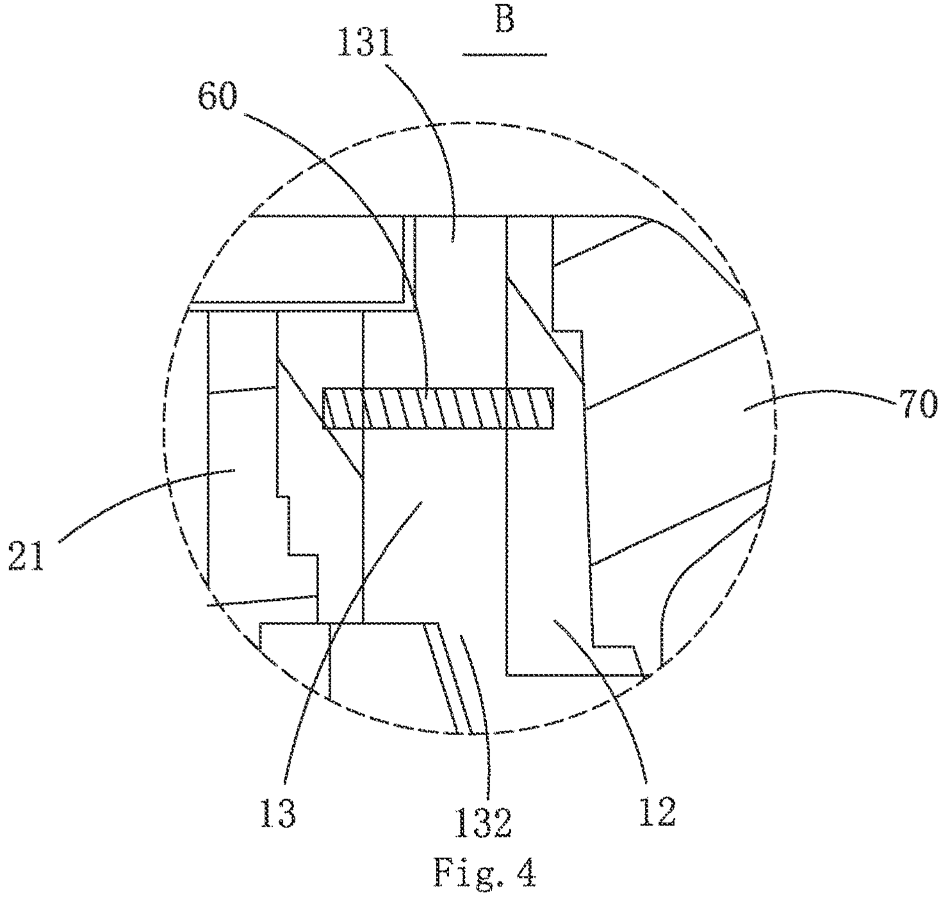
FIG. 4 is an enlarged view of part B in FIG. 4.
Figure 5:
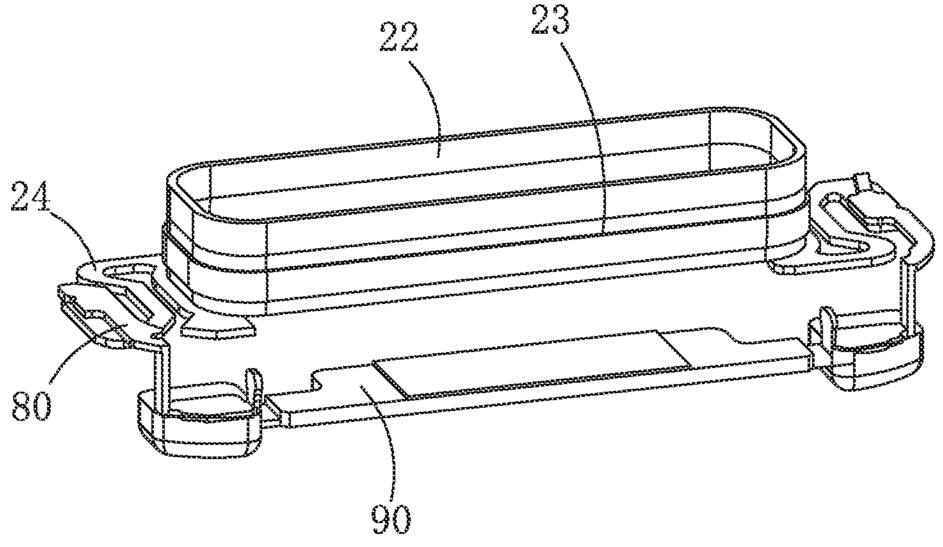
FIG. 5 is an isometric view of an assembly structure of a support member, a coil, a FPC, an electric connection member, and a circuit board of the sounding device in FIG. 1.

Please refer to FIGS. 1-5 together, a sounding device 100 provided by an exemplary embodiment of the present disclosure includes a frame 10, a vibration system 20 mounted on the frame 10, and a magnet system 30 configured to drive the vibration system 20 to generate sound.

The frame 10 includes a holder 11 fixed to the magnet system 30 and a flange 12 fixed to the holder 11. And the vibration system 20 is supported on the flange 12.

The vibration system 20 includes a diaphragm 21 fixed to the flange 12, a support member 22 fixed to the diaphragm 21, and a coil 23 mounted on the support member 22. Specifically, the diaphragm 21 includes a dome 211 located in a central position and an edge portion 212 surrounding the dome 211; an outer edge of the edge portion 212 is fixed to the flange 12. An end of the support member 22 away from the coil 23 is fixed to the dome 211. For electrically activating the coil 23, the vibration system 20 further includes a FPC 24 electrically connected with the coil 23. An end of the FPC 24 is electrically connected with the coil 23, another end of the FPC 24 is fixed to the holder 11.

The magnet system 30 includes a yoke 31 fixed to the holder 11, a main magnet 32 fixed to the yoke 31, a side magnet 34 spaced apart from the main magnet 32 forming a magnetic gap 33, a magnetic plate 35 fixed to a surface of the main magnet 34 facing the diaphragm 21, a reinforced magnet 36 fixed to a surface of the magnetic plate 35 facing the diaphragm 21, and a board 37 fixed to a surface of the side magnet 34 facing the diaphragm 21. The board 37 is fixed to the holder 11. Thus, the yoke 31 and the board 37 are fixed to the holder 11 to support the magnet system 30. The coil 23 is inserted into the magnetic gap 23 via the support member 22 to drive the diaphragm 21 to vibrate for generating sound.

In addition, the diaphragm 21 encloses a front cavity 40 with the frame 10. The front cavity 40 is located on a side of the diaphragm 21 away from the magnet system 30. The sound wave generated by the vibration of the diaphragm 21 is transmitted to outside through the front cavity 40. Furthermore, the diaphragm 21, the frame 10, and the magnet system 30 enclose a rear cavity 50. The rear cavity 50 and the front cavity 40 are individual from each other.

In addition, a connection hole 13 is provided on the frame 10 for connecting the front cavity 40 with the rear cavity 50. An air-permeable membrane 60 is inserted into the frame 10 and covers the connection hole 13 to prevent water from entering the rear cavity 50, thus effectively improving the waterproof performance of the sounding device 100.

It can be understood that the connection hole 13 is provided on the flange 12. The air-permeable membrane 60 and the flange 12 are integrated by injection molding, thus simplifying assembly process and improving assembly efficiency. Besides, the air-permeable membrane 60, the diaphragm 21, and the flange 12 are integrated by injection molding.

For further improving the waterproof performance of the sounding device 100, the sound device 100 includes a silicone waterproof ring 70 surrounding the flange 12. The silicone waterproof ring 70 and the flange 12 are integrated by injection molding.

Moreover, the connection hole 13 includes a first opening 131 communicated with the front cavity 40 and the second opening 132 communicated with the rear cavity 50; the air-permeable membrane 60 is mounted between the first opening 131 and the second opening 132. In another word, the air-permeable membrane 60 is located on a middle position of the connection hole 13.

As shown in FIGS. 2-5, an electric connection member 80 is inserted into the holder 11. The electric connection member 80 is electrically connected with the FPC 24. And, the electric connection member 80 is electrically connected with a circuit board 90 to electrically activate the coil 23.

Compared with the related art, the sounding device includes a connection hole communicating the front cavity with the rear cavity. An air-permeable membrane is integrated on the frame by injection molding, thus achieving waterproof effect and air permeability. Without providing the through hole and the air-permeable membrane on the diaphragm, the assembly of the air-permeable membrane and the frame reduce the assembly difficulty of the sounding device, thereby ensuring the stable vibration performance of the diaphragm and the high acoustic performance of the sounding device.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device comprising:

a frame, a vibration system mounted on the frame, comprising a diaphragm fixed to the frame and enclosing a front cavity with the frame; and a magnet system configured to drive the vibration system to generate sound, enclosing a rear cavity with the diaphragm and the frame; wherein a connection hole is provided on the frame for connecting the front cavity with the rear cavity; an air-permeable membrane is inserted into the frame and covers the connection hole;

the frame and the air-permeable membrane are integrated by injection molding; the frame comprises a holder fixed to the magnet system and a flange fixed to the holder; the diaphragm is fixed to the flange, the connection hole is provided on the flange, the air-permeable membrane, the diaphragm, and the flange are integrated by injection molding;

the sound device further comprises a silicone waterproof ring surrounding the flange, the silicone waterproof ring and the flange are integrated by injection molding.

2. The sounding device as described in claim 1, wherein the connection hole comprises a first opening communicated with the front cavity and a second opening communicated with the rear cavity; the air-permeable membrane is mounted between the first opening and the second opening.

3. The sounding device as described in claim 1, wherein an outer edge of the diaphragm is fixed to the flange.

4. The sounding device as described in claim 1, wherein the diaphragm comprises a dome located in a central position and an edge portion surrounding the dome; an outer edge of the edge portion is fixed to the flange.

* * * * *